(12) United States Patent
Aoyagi

(10) Patent No.: US 10,584,649 B2
(45) Date of Patent: Mar. 10, 2020

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Shinsuke Aoyagi, Isehara (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/140,810

(22) Filed: Sep. 25, 2018

(65) Prior Publication Data

US 2019/0101065 A1 Apr. 4, 2019

(30) Foreign Application Priority Data

Oct. 2, 2017 (JP) ................. 2017-192735

(51) Int. Cl.
*F02D 13/02* (2006.01)
*F02M 26/09* (2016.01)
*F02D 41/00* (2006.01)

(52) U.S. Cl.
CPC ..... *F02D 13/0261* (2013.01); *F02D 41/0052* (2013.01); *F02D 41/0077* (2013.01); *F02M 26/09* (2016.02); *F02D 41/0007* (2013.01); *F02D 2041/001* (2013.01); *F02D 2200/0406* (2013.01)

(58) Field of Classification Search
CPC ............. F02D 13/0261; F02D 41/0052; F02D 41/0077; F02D 2041/001; F02D 2200/0406; F02D 41/0007; F02D 13/0276; F02D 41/005; F02D 13/0238; F02D 13/0265; F02D 41/0065; F02D 13/023; F02D 41/0002; F02D 2200/04; F02M 26/09

USPC .................. 60/600, 602, 605.1, 605.2, 611
See application file for complete search history.

(56) References Cited

U.S. PATENT DOCUMENTS

| | | | | |
|---|---|---|---|---|
| 4,391,240 A | * | 7/1983 | Sugasawa | F02D 17/02 123/198 F |
| 5,427,078 A | * | 6/1995 | Hitomi | F02B 33/34 123/559.1 |
| 2002/0134081 A1 | * | 9/2002 | Shiraishi | F01N 3/28 60/602 |
| 2003/0217733 A1 | * | 11/2003 | Shiraishi | F01N 3/0814 123/295 |

(Continued)

FOREIGN PATENT DOCUMENTS

JP  2000-073875  3/2000

*Primary Examiner* — Hoang M Nguyen
(74) *Attorney, Agent, or Firm* — Finnegan, Henderson, Farabow, Garrett & Dunner, LLP

(57) ABSTRACT

A control device for an internal combustion engine that includes an external EGR device having an EGR passage and an EGR valve installed at an end portion of the EGR passage on the side of a cylinder is configured, when a high intake air pressure condition is met and there is no EGR gas introduction request, to execute an EGR cut control using a variable valve operating device. In the EGR cut control, the control device is configured to open an intake valve during the intake stroke after the EGR valve opens, and adjust an overlap area such that an outflow gas amount via the EGR valve becomes equal to an inflow gas amount via the EGR valve. The EGR passage is configured so as to store a gas that flows out to the EGR passage from the cylinder via the EGR valve during of the EGR cut control.

5 Claims, 10 Drawing Sheets

(56) References Cited

U.S. PATENT DOCUMENTS

| | | | |
|---|---|---|---|
| 2010/0179745 A1* | 7/2010 | Nakayama | F02D 41/0072 701/108 |
| 2012/0303249 A1* | 11/2012 | Minami | F02D 41/0072 701/112 |
| 2018/0266365 A1 | 9/2018 | Aoyagi | |

* cited by examiner

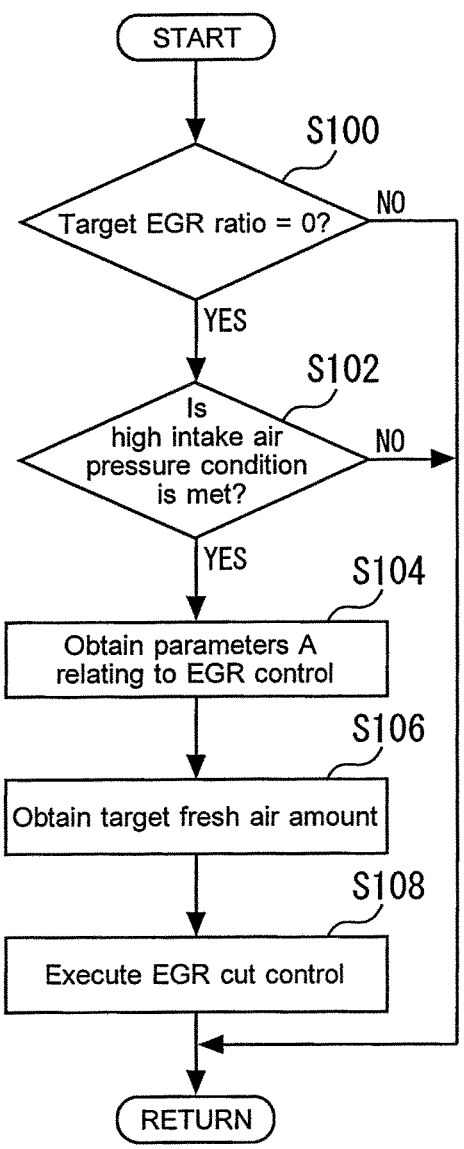

CONTROL DEVICE FOR INTERNAL COMBUSTION ENGINE

CROSS-REFERENCE TO RELATED APPLICATION

This application is based on and claims the benefit of Japanese Patent Application No. 2017-192735, filed on Oct. 2, 2017, which is incorporated by reference herein in its entirety.

BACKGROUND

Technical Field

The present disclosure relates to a control device for an internal combustion engine, and more particularly to a control device suitable for controlling an internal combustion engine that includes an EGR passage that connects an exhaust gas passage with a cylinder and an EGR valve provided at an end of this EGR passage on the side of the cylinder.

Background Art

For example, JP 2000-073875 A discloses an external EGR device of a diesel engine. This external EGR device is equipped with an EGR passage that connects an exhaust gas passage and a cylinder, and an EGR valve provided at an end of this EGR passage on the side of the cylinder. The EGR valve is opened during the intake stroke.

Furthermore, the external EGR device described above is equipped with an EGR control valve for controlling the amount of EGR gas, which is provided at a connecting portion between the exhaust gas passage and the EGR passage. In this diesel engine, the recirculation of the exhaust gas into the cylinder by the external EGR device can be stopped when this EGR control valve is closed.

SUMMARY

As described above, according to the diesel engine disclosed in JP 2000-073875 A, the EGR control valve is used to stop the introduction of the EGR gas into the cylinder. On the other hand, there is known a variable valve operating device that makes variable the characteristics (such as, the phase, lift amount and operating angle) of a valve that opens and closes a combustion chamber of an internal combustion engine. The valve is typically an intake valve or an exhaust valve, and the EGR valve disclosed in JP 2000-073875 A also corresponds to the valve. If the recirculation of the exhaust gas into the cylinder by the external EGR device can be substantially stopped by the use of this kind of variable valve operating device, the EGR control valve described above can be omitted.

The present disclosure has been made to address the problem described above, and is intended for an internal combustion engine that includes an external EGR device having an EGR passage configured to connect an exhaust gas passage with a cylinder, and an EGR valve installed at an end portion of this EGR passage on the side of the cylinder. Also, an object of the present disclosure is to provide a control device for an internal combustion engine by which, in a high intake air pressure condition in which the pressure in an intake port of an intake air passage is higher than the pressure in an EGR port of the EGR passage, the recirculation of the exhaust gas by the external EGR device can be substantially stopped while the blow-through of the fresh air to the exhaust gas passage from the cylinder via the EGR passage is reduced, without an EGR control valve separately provided at a connecting portion between the EGR passage and the exhaust gas passage.

A control device for controlling an internal combustion engine according to the present disclosure is configured to control an internal combustion engine that includes:

a supercharger configured to supercharge intake air that flows through an intake air passage;

an intake valve installed at an end portion of the intake air passage on a side of a cylinder;

an exhaust valve installed at an end portion of an exhaust gas passage on a side of the cylinder;

an external EGR device that includes an EGR passage configured to connect the exhaust gas passage with the cylinder, and an EGR valve installed at an end portion of the EGR passage on a side of the cylinder; and a variable valve operating device configured to change at least one of opening-characteristics of the EGR valve and opening-characteristics of the intake valve.

An EGR valve lift crank angle period in which the EGR valve opens is provided so as to be located at a part of an intake stroke or to extend from a crank angle position in an exhaust stroke to a crank angle position in the intake stroke.

The control device is configured, when a high intake air pressure condition in which a pressure in an intake port of the intake air passage is higher than a pressure in an EGR port of the EGR passage is met and there is no EGR gas introduction request for the external EGR device, to execute an EGR cut control by use of the variable valve operating device.

The control device is configured, in the EGR cut control, to: open the intake valve during the intake stroke after the EGR valve opens; and adjust an overlap area that is an area of a portion in which a lift curve of the EGR valve overlaps with a lift curve of the intake valve such that an outflow gas amount into the EGR passage from the cylinder via the EGR valve becomes equal to an inflow gas amount into the cylinder from the EGR passage via the EGR valve, and wherein the EGR passage is configured so as to store a gas that flows out to the EGR passage from the cylinder via the EGR valve during execution of the EGR cut control.

The variable valve operating device may be configured to change a phase of the intake valve. In the EGR cut control, the control device may be configured to adjust the phase of the intake valve to adjust the overlap area such that the outflow gas amount becomes equal to the inflow gas amount.

The variable valve operating device may be configured to change at least of one of a lift amount and operating angle of the intake valve. In the EGR cut control, the control device may be configured to adjust at least one of the lift amount and operating angle of the intake valve to adjust the overlap area such that the outflow gas amount becomes equal to the inflow gas amount.

The internal combustion engine may include a throttle valve installed in the intake air passage. The control device may be configured, if the high intake air pressure condition is met by opening the throttle valve when an opening degree of the throttle valve is smaller than a full open degree and there is no EGR gas introduction request, to execute the EGR cut control while opening the throttle valve to meet the high intake air pressure condition.

The supercharger may be a turbo-supercharger equipped with a compressor installed in the intake air passage and a turbine installed in the exhaust gas passage. The EGR passage may be connected to a portion of the exhaust gas passage located on a downstream side of the turbine.

According to the control device for an internal combustion engine of the present disclosure, when the high intake air pressure condition is met and there is no EGR gas introduction request for the external EGR device, the EGR cut control is executed by use of the variable valve operating device. In the EGR cut control, the intake valve is opened during the intake stroke after the EGR valve is opened. Also, in the EGR cut control, the overlap area concerning the lift curve of the EGR valve and the lift curve of the intake valve is adjusted such that the outflow gas amount into the EGR passage from the cylinder via the EGR valve becomes equal to the inflow gas amount into the cylinder from the EGR passage via the EGR valve. Furthermore, the EGR passage is configured so as to store a gas that flows out to the EGR passage from the cylinder via the EGR valve during execution of the EGR cut control. Thus, if the EGR cut control is executed, the gas moves between the cylinder and the EGR passage via the EGR valve during the EGR valve lift crank angle period. Because of this, according to the present disclosure, the recirculation of the exhaust gas by the external EGR device (i.e., so-called introduction of the external EGR gas) can be substantially stopped while the blow-through of the fresh air to the exhaust gas passage from the cylinder via the EGR passage is reduced, without an EGR control valve separately provided at a connecting portion between the EGR passage and the exhaust gas passage.

BRIEF DESCRIPTION OF THE DRAWINGS

FIG. 7 is a flow chart that illustrates a routine of the processing concerning an EGR cut control according to the first embodiment of the present disclosure;

DETAILED DESCRIPTION

In the following, embodiments of the present disclosure are described with reference to the accompanying drawings. It is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Further, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Figure 1:
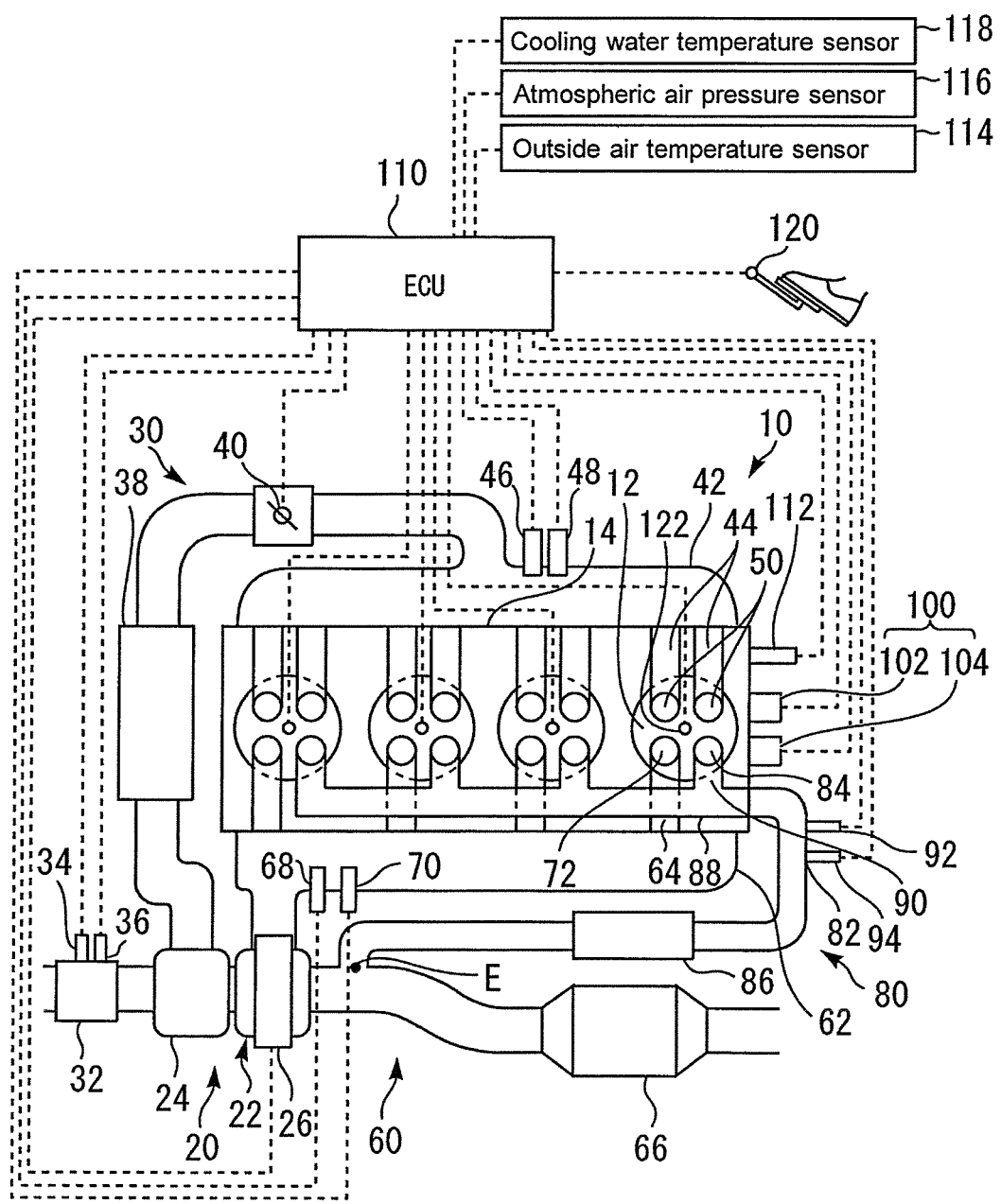
FIG. 1 is a diagram for describing a configuration of a system according to a first embodiment of the present disclosure.

First, a first embodiment according to the present disclosure will be described with reference to FIGS. 1 to 7.
1. Example of Configuration of System According to First Embodiment FIG. 1 is a diagram for describing a configuration of the system according to the first embodiment of the present disclosure. The system shown in FIG. 1 includes a compression-ignition type internal combustion engine (diesel engine) 10. The internal combustion engine 10 is mounted on a vehicle, for example. Although the internal combustion engine 10 is, as an example, an in-line four cylinder engine, the number of cylinders of internal combustion engines according to the present disclosure may alternatively one, or plural other than four. In addition, internal combustion engines adapted to the present disclosure may alternatively be, for example, a spark-ignition type internal combustion engine (for example, gasoline engine), instead of the compression-ignition type internal combustion engine.
1-1. Supercharger The internal combustion engine 10 is a supercharged engine and is provided with a turbo-supercharger 20 as an example of superchargers. In more detail, as an example, the turbo-supercharger 20 is a variable nozzle type turbo-supercharger that includes a turbine 22, a compressor 24 and a variable nozzle device 26. The turbine 22 is driven to rotate by the exhaust energy. The compressor 24 rotates along with the turbine 22 and supercharges intake air. The variable nozzle device 26 changes the opening degree of a plurality of variable nozzle vanes (VN opening degree) to change the flow velocity of the exhaust gas that flows into the turbine 22, and can thereby adjust the supercharging pressure.
1-2. Intake System An intake air passage 30 communicates with each cylinder 12 of the internal combustion engine 10. In detail, an air cleaner 32 is provided in the vicinity of an inlet of the intake air passage 30. An air flow sensor 34 that outputs a signal responsive to the flow rate of the air (fresh air) taken into the intake air passage 30 and a humidity sensor 36 that outputs a signal responsive to the humidity of this air are attached to the air cleaner 32.

In a portion of the intake air passage 30 located on the downstream side of the air cleaner 32, the compressor 24 described above is installed. In a portion of the intake air passage 30 located on the downstream side of the compressor 24, an intercooler 38 for cooling the intake gas that has been compressed by the compressor 24 is installed. An electronically controlled throttle valve 40 for adjusting the flow rate of the intake air that flows through the intake air passage 30 is arranged downstream of the intercooler 38.

An intake manifold 42 for distributing the intake air toward each cylinder 12 is provided on the downstream side of the throttle valve 40. Inside of the cylinder head 14, intake ports 44 that connect the respective outlets of the intake manifold 42 with the respective cylinders 12 (respective combustion chambers) are formed. Passages in the intake manifold 42 and also in the intake ports 44 serve as a part of the intake air passage 30. In the example shown in FIG. 1, two intake ports 44 are provided for each cylinder 12.

In a collective portion of the intake manifold 42, an intake air pressure sensor 46 that outputs a signal responsive to the intake air pressure (intake manifold pressure (supercharging pressure)) and an intake air temperature sensor 48 that outputs a signal responsive to the intake air temperature are installed.

1-3. Exhaust System

Moreover, an exhaust gas passage 60 communicates with each cylinder 12. In detail, inside the cylinder head 14, exhaust ports 64 that connect each cylinder 12 (each combustion chamber) with an exhaust manifold 62 are formed. Passages in the exhaust manifold 62 and also in the exhaust ports 64 serve as a part of the exhaust gas passage 60. In the example shown in FIG. 1, one exhaust port 64 is provided for each cylinder 12.

In a portion of the exhaust gas passage 60 located on the downstream side of the exhaust manifold 62, the turbine 22 described above is installed. Exhaust gases from the individual cylinders 12 that are gathered by the exhaust manifold 62 flow into the turbine 22. An exhaust gas purifying device (i.e., after-treatment device) 66 for purifying the exhaust gas are arranged downstream of the turbine 22.

In a collective portion of the exhaust manifold 62, an exhaust gas pressure sensor 68 that outputs a signal responsive to the exhaust gas pressure (exhaust manifold pressure) and an exhaust gas temperature sensor 70 that outputs a signal responsive to the exhaust gas temperature are installed.

1-4. External EGR Device

The internal combustion engine 10 shown in FIG. 1 is provided with an external EGR device (hereunder, also simply referred to as an "EGR Device") 80. The EGR device 80 is equipped with an EGR passage 82, an EGR valve 84 and an EGR cooler 86. The EGR passage 82 connects the exhaust gas passage 60 with each cylinder 12. Control of the EGR gas flow rate is performed by the use of a variable valve operating device 100 as described later.

More specifically, the EGR passage 82 connects, with each cylinder 12, a portion of the exhaust gas passage 60 located on the downstream side of the turbine 22, and can recirculate, into each cylinder 12, a part of the exhaust gas that flows through the exhaust gas passage 60, as an EGR gas (so-called external EGR gas). In the example shown in FIG. 1, an EGR manifold 88 for distributing the EGR gas toward each cylinder 12 and EGR ports 90 that connect the EGR manifold 88 with each cylinder 12 are formed inside the cylinder head 14. Passages in the EGR manifold 88 and also in the EGR ports 90 serve as a part of the EGR passage 82. In the example shown in FIG. 1, one EGR port 90 is provided for each cylinder 12.

The EGR valve 84 is installed at an end portion of the EGR passage 82 located on the side of the cylinders 12. That is, the EGR valve 84 opens and closes the cylinder 12 (combustion chamber). The EGR cooler 86 cools the exhaust gas (EGR gas) that has flown into the EGR passage 82 from the exhaust gas passage 60. Moreover, in the EGR passage 82 (in more detail, a portion of the EGR passage 82 located on the downstream side of the EGR cooler 86 and the upstream side of the EGR manifold 88 with respect to the EGR gas flow), an EGR gas pressure sensor 92 that outputs a signal responsive to the pressure of the EGR gas and an EGR gas temperature sensor 94 that outputs a signal responsive to the temperature of the EGR gas are installed.

(Volume of EGR Passage)

The EGR passage 82 is configured such that the gas (mainly, fresh air) that flows out from each cylinder 12 to the EGR passage 82 via the EGR valve 84 can be stored during execution of an EGR cut control described later. In more detail, since the internal combustion engine 10 has a plurality of (for example, four) cylinders 12, the EGR passage 82 is configured so as to have a volume required to cause the gas that has flown out from each cylinder 12 to the EGR passage 82 during the EGR cut control not to flow out to the outside of the EGR passage 82 (that is, to the inside of the exhaust gas passage 60).

1-5. Valve Train

In the example of the internal combustion engine 10 shown in FIG. 1, four valves are provided as valves for opening and closing each cylinder 12 (combustion chamber). Two of them are the intake valves 50 that are installed at end portions of the intake air passage 30 (intake ports 44) located on the side of the cylinder 12; another of them is the exhaust valve 72 that is installed at an end portion of the exhaust gas passage 60 located on the side of the cylinder 12; and the other is the EGR valve 84 described above. Any of these valves 50, 72 and 84 are typically poppet valves. It should be noted that the number of each of these valves 50, 72 and 84 may not always be fixed as in the example described above, and may be arbitrarily fixed.

The internal combustion engine 10 is provided with the variable valve operating device 100. The variable valve operating device 100 includes an intake variable valve operating device 102 that makes variable the opening-characteristics of the intake valves 50, and an EGR variable valve operating device 104 that makes variable the opening-characteristics of the EGR valve 84. It should be noted that the exhaust valve 72 is driven, for example, by an exhaust valve operating device (not shown) with a constant opening-characteristics.

Examples of the opening-characteristics that are changed by the intake variable valve operating device 102 and the EGR variable valve operating device 104 are the phase, lift amount and operating angle of the intake valve 50 and the EGR valve 84, respectively. In more detail, the change of the phase of a valve corresponds to a change of the phase of a valve lift curve with respect to the crank angle. The lift amount of a valve indicates the maximum lift amount of a valve lift curve. Furthermore, the operating angle of a valve corresponds to a crank angle period (crank angle width).

The intake variable valve operating device 102 has a phase-variable function that continuously changes the phase of the intake valve 50 within a certain crank angle range, and a continuously variable lift-amount-and-operating-angle function that continuously changes the lift amount and operating angle of the intake valve 50. The EGR variable valve operating device 104 also has a similar phase-variable function and a similar continuously variable lift-amount-and-operating-angle function.

The phase-variable function can be achieved by the use of, for example, a phase variable device (not shown) that can change the rotation phase of a camshaft with respect to the rotation phase of a crankshaft. Moreover, the continuously variable lift-amount-and-operating-angle function can be achieved by the use of, for example, a known variable valve lift device that can continuously change the lift amount and operating angle of a valve. In addition, in order to achieve both the above-described functions of the intake valve 50, a phase variable device and variable valve lift device that utilize a camshaft for the intake valve 50 may alternatively be provided. Furthermore, in order to achieve both the above-described functions of the EGR valve 84, a phase variable device and variable valve lift device that utilize a camshaft for the EGR valve 84 may alternatively be provided while having a double structure composed of a camshaft for the exhaust valve 72 and the camshaft for the EGR valve 84.

Figure 2:
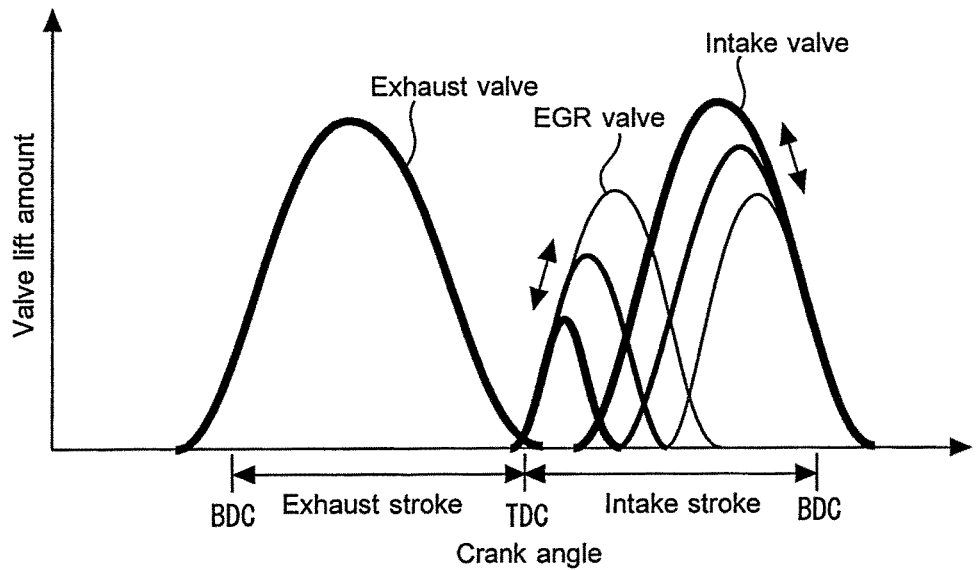
FIG. 2 is a graph that illustrates an example of lift curves of intake valves and an EGR valve achieved by a variable valve operating device shown in FIG. 1 as well as a lift curve of an exhaust valve.

FIG. 2 is a graph that illustrates an example of lift curves of the intake valves 50 and the EGR valve 84 achieved by the variable valve operating device 100 shown in FIG. 1 as well as a lift curve of the exhaust valve 72. As shown in FIG. 2, the intake variable valve operating device 102 is configured so as to be able to continuously change the lift amount and operating angle of the intake valves 50 using the continuously variable lift-amount-and-operating-angle function while causing the closing timing of the intake valve 50$s$ to coincide with a certain timing in the compression stroke using the phase variable function. Moreover, the EGR variable valve operating device 104 is configured so as to be able to continuously change the lift amount and operating angle of the EGR valve 84 using the continuously variable lift-amount-and-operating-angle function while causing the opening timing of the EGR valve 84 to coincide with an exhaust top dead center (TDC) using the phase variable function. Furthermore, this kind of change of the opening-characteristics of the intake valves 50 and EGR valve 84 is performed while enabling a part of the lift curve of the EGR valve 84 and a part of the lift curve of each intake valve 50 to overlap with each other in the intake stroke. It should be noted that, for example, the exhaust valve 72 opens at a certain timing in the expansion stroke and closes in the vicinity of the exhaust top dead center.

1-6. Control System

As shown in FIG. 1, the system according to the present embodiment is further provided with an electronic control unit (ECU) 110. Various sensors installed in the internal combustion engine 10 and the vehicle on which the internal combustion engine 10 is mounted and various actuators for controlling the operation of the internal combustion engine 10 are electrically connected to the ECU 110.

The various sensors described above include a crank angle sensor 112 that outputs a signal responsive to the crank angle, an outside air temperature sensor 114, an atmospheric air pressure sensor 116, a cooling water temperature sensor 118, and an accelerator position sensor 120, as well as the air flow sensor 34, the humidity sensor 36, the pressure sensors 46, 68, 92, the temperature sensors 48, 70, 94 described above. The outside air temperature sensor 114, the atmospheric air pressure sensor 116, the cooling water temperature sensor 118, and the accelerator position sensor 120 respectively output signals responsive to the outside air temperature, the atmospheric air pressure, the engine cooling water temperature and the accelerator position. The ECU 110 can obtain an engine speed by the use of the crank angle sensor 112. Moreover, the various actuators described above include fuel injection valves 122 that inject fuel into the respective cylinders 12, as well as the variable nozzle device 26, the throttle valve 40 and variable valve operating device 100 (102 and 104) described above.

The ECU 110 includes a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "control device" according to the present embodiment are achieved.

1-7. Characteristics of Hardware of Internal Combustion Engine (Achievement of Both of High Supercharging and EGR Gas Introduction)

In contrast to the external EGR device 80 according to the present embodiment, according to a high pressure loop (HPL) EGR device, an EGR passage is connected to a portion of an exhaust gas passage located on the upstream side of a turbine. Thus, when the introduction of the EGR gas is performed, the amount of the exhaust gas that flows into the turbine decreases. Moreover, if the EGR passage is connected to the portion of the exhaust gas passage located on the upstream side of the turbine, the volume of the portion of the exhaust gas passage located on the upstream side of the turbine increases by the volume of the EGR passage. As a result, the pulsation of the exhaust gas attenuates, and there is a concern that the turbine work may decreases. Due to these reasons, if the HPL EGR device is adopted, there is the possibility that it may become difficult to increase the supercharging pressure.

Contrary to the above, according to the EGR device 80 of the present embodiment, the exhaust gas that has passed through the turbine 22 is taken out to the EGR passage 82 as the EGR gas. Thus, a decrease of the flow rate of the exhaust gas that passes through the turbine 22 can be reduced. Also, the volume of a portion of the exhaust gas passage 60 located on the upstream side of the turbine 22 does not increase due to the presence of the EGR passage 82. Thus, the EGR gas can be introduced while producing a high supercharging. Furthermore, according to the HPL EGR device described above, since the exhaust gas passages for the respective cylinders communicate with each other as a result of the connection between the EGR passage and the portion of the exhaust gas passage located on the upstream side of the turbine, it becomes difficult to adopt a twin scroll turbo-supercharger. On the other hand, by the utilization of the EGR device 80, the twin scroll type can be easily adopted.

(Introduction of EGR Gas in Condition Where Intake Air Pressure Is Higher Than Exhaust Gas Pressure)

Moreover, according to the HPL EGR device, the EGR passage is connected to a portion of an intake air passage located on the downstream side of a throttle valve. In this kind of configuration, in a condition in which the pressure in the intake air passage is higher than the pressure in the exhaust gas passage due to a high turbo efficiency, if an EGR valve that opens and closes the EGR passage opens, the fresh air that flows through the intake air passage blows through into the EGR passage. Thus, in this condition, it becomes difficult to introduce the EGR gas.

Figure 3:
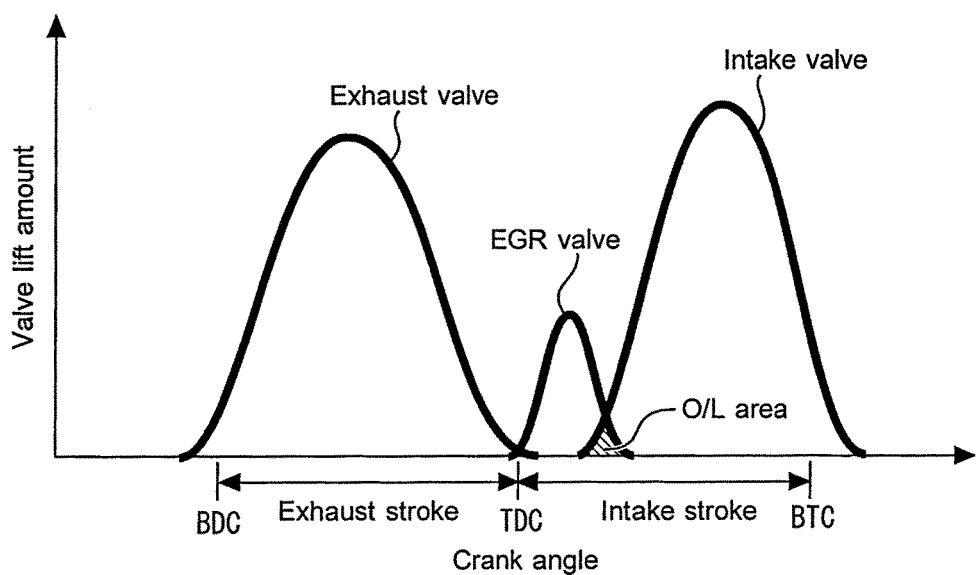
FIG. 3 is a graph that illustrates an example of the setting of a phase, lift amount and operating angle of each of the intake valves and the EGR valve in a map M1 used during introduction of an EGR gas.

In contrast to the above, according to the EGR device 80 of the present embodiment, a crank angle period in which the EGR valve 84 and the intake valves 50 open during the intake stroke is properly set (for example, as shown in FIG. 3 described later). Therefore, even in the condition in which the intake air pressure (supercharging pressure) is higher than the exhaust gas pressure, it becomes possible to introduce the EGR gas into the cylinders 12.

(Reduction in Delay of Introduction of EGR Gas)

In a configuration in which an EGR passage that connects an exhaust gas passage and an intake air passage includes (for example, the HPL EGR device described above or a low pressure loop (LPL) EGR device), the distance from an EGR valve to a cylinder becomes longer. Therefore, even if the opening degree of the EGR valve is adjusted, it takes a certain time until the amount of the EGR gas that is taken into the cylinder actually changes (that is, the delay of the introduction of the EGR gas is great).

In contrast to this, according to the EGR device 80 of the present embodiment, at least one of the opening-characteristics of the EGR valve 84 and the opening-characteristics of the intake valves 50 are controlled as described later in detail. This makes it possible to promptly switch whether or not the EGR gas is introduced and to promptly adjust the flow rate of the EGR gas.

2. EGR Control 2-1. Introduction of EGR Gas and Adjustment of Flow Rate of EGR Gas According to the internal combustion engine 10 that includes the external EGR device 80 and the variable valve operating device 100 described above, the introduction of the EGR gas and the adjustment of the flow rate of the EGR gas are performed by the use of the control of the opening-characteristics of the intake valves 50 and the control of the opening-characteristics of the EGR valve 84.

In more detail, the EGR ratio is controlled by controlling the flow rate of the EGR gas that flows into the cylinders 12 by the use of the control of the opening-characteristics of the intake valves 50 and the control of the opening-characteristics of the EGR valve 84. The EGR ratio [%] is obtained by dividing the amount of the EGR gas charged into the cylinder 12 by the total amount of the fresh air and the EGR gas charged into the cylinder 12 and by multiplying it by 100.

(Determination Method (Adaptation Method) of Phase, Lift Amount and Operating Angle of Intake Valve and EGR valve)

In the internal combustion engine 10, target EGR ratios are set for the respective engine operating points in an engine operating region defined by the engine load (fuel injection amount) and the engine speed. Also, in the internal combustion engine 10, target fresh air amounts are set for the respective engine operating points in the engine operating region. Control of the fresh air amount can be performed by, for example, adjusting the opening degree of the throttle valve 40 and the VN opening degree.

According to the present embodiment, the phase, lift amount and operating angle of each of the intake valves 50 and the EGR valve 84 that satisfy the target EGR ratio at each engine operating point are determined such that, while the target fresh air amount is satisfied, the fuel consumption becomes the smallest (in other words, the engine torque becomes the highest). An example of this determination method is described as follows.

Specifically, an experiment or a simulation is performed while changing the phase, lift amount and operating angle of each of the intake valves 50 and the EGR valve 84 under a condition in which various parameters A relating to the EGR control are constant. Then, based on the results obtained, a combination of the respective phases, lift amounts and operating angles of the intake valves 50 and the EGR valve 84 by which the fuel consumption becomes the smallest is determined while satisfying the target EGR ratio and the target fresh air amount. This kind of processing is performed with the parameters A being changed. As a result, the phase, lift amount and operating angle of each of the intake valves 50 and the EGR valve 84 that satisfy the above-described requests (such as the target EGR ratio) is obtained within ranges of the parameters A that are supposed during operation of the internal combustion engine 10. In the ECU 110, a relationship obtained in this way (i.e., a relationship between the parameters A, and the phase, lift amount and operating angle of each of the intake valves 50 and the EGR valve 84) is stored as a map M1. Thus, by the use of this kind of map M1 during operation of the internal combustion engine 10, the phase, lift amount and operating angle of each of the intake valves 50 and the EGR valve 84 can be determined such that the requests described above are satisfied under the current condition of the parameters A. It should be noted that the parameters A are, for example, the engine speed, the fuel injection amount, the outside air temperature, the atmospheric air pressure, the engine cooling water temperature, the atmospheric air (intake air) humidity, the pressure and temperature in the intake manifold 42, the pressure and temperature in the exhaust manifold 62, and the pressure and temperature in the EGR manifold 88.

(Example of Setting of Phase, Lift Amount and Operating Angle of Intake Valve and EGR Valve)

FIG. 3 is a graph that illustrates an example of the setting of the phase, lift amount and operating angle of each of the intake valves 50 and the EGR valve 84 in the map M1 used during introduction of the EGR gas. The example shown in FIG. 3 is addressed to a condition in which the pressure in the intake ports 44 is lower than the pressure in the exhaust ports 64. In this example, the EGR valve 84 and the intake valves 50 sequentially open during the intake stroke, and a part of the lift curve of the EGR valve 84 and a part of the lift curve of each intake valve 50 overlap with each other. If both the EGR valve 84 and the intake valves 50 are open, the amount of inflow of the EGR gas decreases by an amount of inflow of the fresh air via the intake valves 50. Therefore, if an overlap area (hereafter, referred to as an "O/L area") that is the area of a portion in which these lift curves overlap with each other as a result of the adjustment of at least one of the opening-characteristics of the intake valves 50 and the opening-characteristics of the EGR valve 84 becomes wider, the flow rate of the EGR gas becomes smaller and the EGR ratio thus becomes lower.

In further addition to the above, according to the internal combustion engine 10 that includes the EGR device 80 and the variable valve operating device 100, contrary to the example shown in FIG. 3, the overlap between the EGR valve 84 and the intake valves 50 are not provided by opening and closing the intake valves 50 after the EGR valve opens and closes during the intake stroke. Thus, even if the condition in which the pressure in the intake ports 44 is higher than the pressure in the exhaust ports 64, the introduction of the EGR gas is available while the blow-through of the fresh air into the EGR passage 82 is avoided. This is because, when the EGR valve 84 is open, the pressure in each cylinder 12 becomes negative due to a descent of the piston and, on the other hand, the pressure at the portion of the exhaust gas passage 60 located on the downstream side of the turbine 22 becomes the atmospheric air pressure or its vicinity, and the pressure in each cylinder 12 thus becomes lower than the pressure in the EGR passage 82. Therefore, the EGR gas is supplied into each cylinder 12 via the EGR passage 82. In addition, if the opening timing of each intake valve 50 is more retarded relative to the closing timing of the EGR valve 84, even when the intake valves 50 open to supply a high pressure intake air into each cylinder 12, the intake air does not blow through toward the EGR passage 82.

2-2. EGR Cut Control

During operation of the internal combustion engine 10, the introduction of the EGR gas sometimes is not required. According to the internal combustion engine 10 that includes the EGR device 80 and the variable valve operating device 100, when there is no EGR gas introduction request in a pressure condition in which the pressure in the intake ports 44 is higher than the pressure in the EGR ports 90 (hereunder, simply referred to as a "high intake air pressure condition"), an "EGR cut control" as described below is performed.

Specifically, according to the EGR cut control of the present embodiment, the variable valve operating device 100 is used such that the intake valves 50 opens during the intake stroke after the EGR valve 84 opens during the intake stoke and also such that the O/L area concerning the lift curve of the EGR valve 84 and the lift curve of each intake valve 50 is adjusted to cause an outflow gas amount Gout to be equal to an inflow gas amount Gin. The outflow gas amount Gout is the amount of gas that flows out from the cylinders 12 into the EGR passage 82 via the EGR valve 84, and the inflow gas amount Gin is the amount of gas that flows into the cylinders 12 from the EGR passage 82 via the EGR valve 84.

2-2-1. Principle of Stopping Recirculation of Exhaust Gas Without Closing EGR Valve According to the EGR cut control of the present embodiment, the adjustment of the O/L area described above is performed by, as an example, adjustment of both of the phase, lift amount and operating angle of the EGR valve 84 and the phase, lift amount and operating angle of each intake valve 50. However, in the following explanation on the principle of stopping the recirculation of the exhaust gas, which is made with reference to FIGS. 4 to 6, for simplicity of explanation, an example in which only the adjustment of the phase of the EGR valve 84 is performed as the EGR cut control is used.

Figure 4:
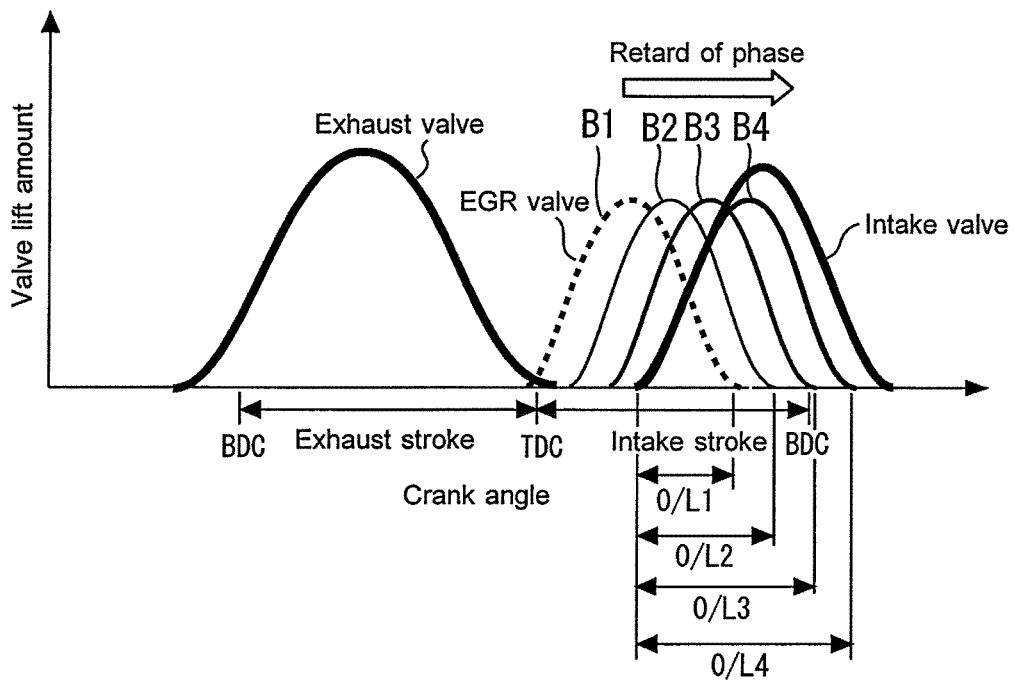
FIG. 4 is a graph that illustrates an example of adjustment of the phase of the EGR valve.

FIG. 4 is a graph that illustrates an example of adjustment of the phase of the EGR valve 84. In more detail, FIG. 4 represents phases B2, B3 and B4 that are obtained by gradually retarding the phase of the EGR valve 84 from a base phase B1 while fixing the lift curve of each intake valve 50 (and the exhaust valve 72). It should be noted that, in the base phase B1, the EGR valve 84 opens at the exhaust top dead center.

In the example shown in FIG. 4, the greater the retard amount of the phase of the EGR valve 84 is, the longer the overlap period (O/L period) between the EGR valve 84 and each intake valve 50 becomes. Examples O/L1-O/L4 of the O/L period in FIG. 4 correspond to the phases B1-B4 of the EGR valve 84, respectively. According to the adjustment of the phase of the EGR valve 84, the longer the O/L period is, the wider the O/L area becomes.

Figure 5:
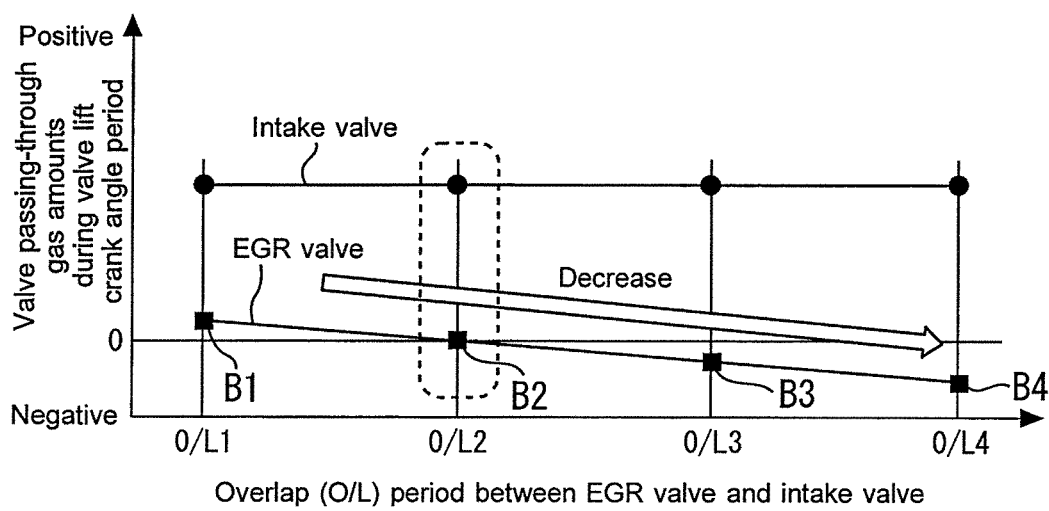
FIG. 5 is a graph that illustrates a relationship at a high intake air pressure condition between valve passing-through gas amounts [g] of the intake valves and the EGR valve, and an O/L period between the EGR valve and each intake valve.

FIG. 5 is a graph that illustrates a relationship at the high intake air pressure condition between valve passing-through gas amounts [g] of the intake valves 50 and the EGR valve 84, and the O/L period between the EGR valve 84 and each intake valve 50. In more detail, the example shown in FIG. 5 indicates experiment results obtained when the adjustment of the phase of the EGR valve 84 is performed under a condition in which various parameters A relating to the EGR control are constant. The valve passing-through gas amount in FIG. 5 refers to the amount of gas that flows into the cylinders 12 during a valve lift crank angle period. Thus, the valve passing-through gas amount indicates a negative value when the amount of gas that flows out from the cylinders 12 is greater than the amount of gas that flows into the cylinders 12 during the valve lift crank angle period.

FIG. 5 corresponds to four O/L periods (O/L1-O/L4) in FIG. 4. As shown in FIG. 5, as the O/L period becomes longer as a result of an increase of the amount of the retard of the phase of the EGR valve 84 from the base phase B1, the value of the passing-through gas amount of the EGR valve 84 becomes smaller and thereafter reaches zero and then becomes greater on the negative side.

In more detail, in the example of O/L1 that corresponds to the base phase B1, firstly, the EGR valve 84 opens during the intake stroke to cause the EGR gas to flow into the cylinders 12. If the intake valves 50 open thereafter, the fresh air flows into the cylinders 12 since the internal combustion engine 10 is in the high intake air pressure condition. In addition, a part of this fresh air blows through into the EGR passage 82. In this example, although the fresh air blows through into the EGR passage 82 while mixing with a part of the EGR gas that has flown into the cylinders 12, most of the gas that blows through into the EGR passage 82 is the fresh air.

O/L2 is longer than O/L1. Thus, in the example of O/L2, a crank angle period in which only the EGR valve 84 opens becomes shorter as compared to the example of O/L1, and the amount of the EGR gas that flows into the cylinders 12 (=inflow gas amount Gin) becomes smaller. Moreover, the amount of the gas (mainly, fresh air) that blows through into the EGR passage 82 during an EGR valve lift crank angle period (=outflow gas amount Gout) becomes greater as compared to the example of O/L1. Therefore, the value of the passing-through gas amount of the EGR valve 84 becomes smaller as compared to the example of O/L1. In addition, the example of O/L2 corresponds to the example in which the value of the passing-through gas amount of the EGR valve 84 is zero, that is, the example in which the inflow gas amount Gin and the outflow gas amount Gout are equal to each other.

In the example of O/L3, the O/L period becomes much longer. Thus, since the crank angle period in which only the EGR valve 84 opens becomes much shorter, the amount of the EGR gas that flows into the cylinders 12 (=inflow gas amount Gin) becomes much smaller. Also, the amount of the gas (mainly, fresh air) that blows through into the EGR passage 82 during the EGR valve lift crank angle period (=outflow gas amount Gout) becomes much greater. As a result, the value of the passing-through gas amount of the EGR valve 84 becomes much smaller and shows a negative value.

In the example of O/L4, the EGR valve 84 and the intake valves 50 open at the same time. If the opening timing of the EGR valve 84 is equal to or later than the opening timing of each intake valve 50, the inflow itself of the EGR gas from the EGR passage 82 is disturbed by a high pressure fresh air that flows into the cylinders 12 from the intake air passage 30. As a result, in this example, the value of the passing-through gas amount of the EGR valve 84 becomes much greater on the negative side.

In the example shown in FIG. 4, the phase of the EGR valve 84 that should be utilized in the EGR cut control is the phase B2. Next, with respect to FIG. 6, the flow of the gas going in and out the cylinders 12 generated when the phase B2 is used will be described in more detail. It should be noted that the reason why, in the example shown in FIG. 5, the passing-through gas amount of each intake valve 50 becomes constant without depending on the adjustment of the phase of the EGR valve 84 is that the amount of the fresh air is separately controlled such that a target fresh air amount is obtained by the adjustment of the opening degree of the throttle valve 40 and the VN opening degree.

Figure 6:
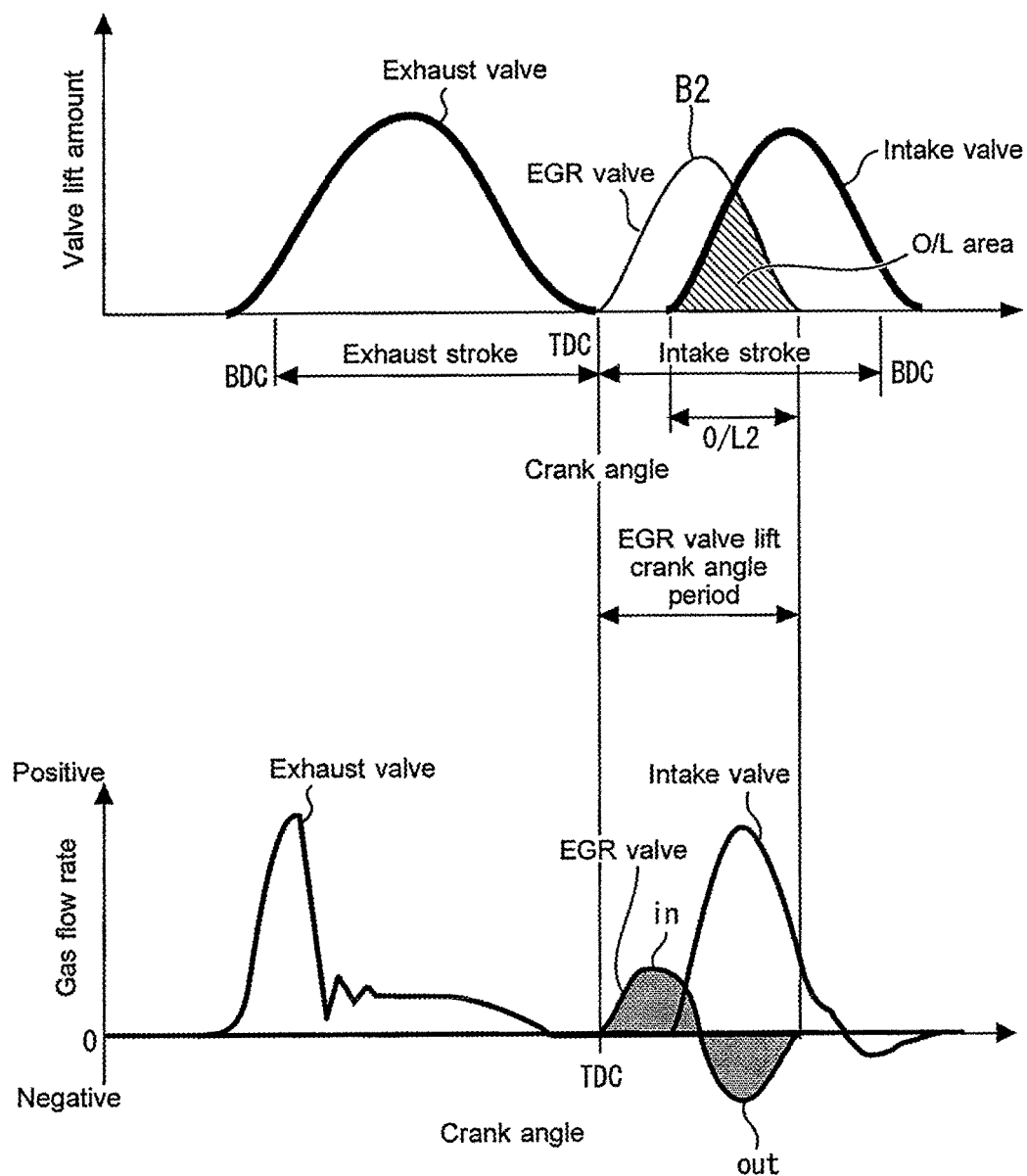
FIG. 6 shows changes of passing-through gas flow rates [g/s] of the respective valves with respect to a crank angle in an example in which a phase B2 shown in FIG. 4 is used.

FIG. 6 shows changes of passing-through gas flow rates [g/s] of the respective valves 50, 72 and 84 with respect to the crank angle in an example in which the phase B2 shown in FIG. 4 is used. It should be noted that the value of the passing-through gas flow rate of the EGR valve 84 shown in FIG. 6 becomes positive when the gas flows into the cylinders 12.

Firstly, when the exhaust valve 72 opens, the exhaust gas is discharged from the cylinders 12 to the exhaust gas passage 60. In an initial cycle in which the lift curves of the intake valves 50 and the EGR valve 84 shown in FIG. 6 are used first, the EGR gas flows into the cylinders 12 from the EGR passage 82 when the EGR valve 84 is solely open. As a result, the passing-through gas flow rate of the EGR valve 84 shows a positive value as shown in FIG. 6.

Next, when the intake valves 50 open during the EGR valve lift crank angle period, the fresh air flows into the cylinders 12 from the intake air passage 30. Since the internal combustion engine 10 is in the high intake air pressure condition, the gas in the cylinders 12 (i.e., mainly, a part of a high pressure fresh air that has flown into the cylinders 12) blows through into the EGR passage 82 as a result of the inflow of the high pressure fresh air into the cylinders 12. As a result, the passing-through gas flow rate of the EGR valve 84 shows a negative value as shown in FIG. 6. When the EGR valve lift crank angle period ends thereafter, the passing-through gas flow rate of the EGR valve 84 becomes zero.

In a cycle next to the initial cycle described above, when the EGR valve 84 is solely open, the gas that has blown through into the EGR passage 82 (mainly, fresh air) in the last cycle flows into the cylinders 12 again. Then, when the intake valves 50 open thereafter, the gas in the cylinders 12 (mainly, fresh air) blows through into the EGR passage 82 during the EGR valve lift crank angle period. Also in cycles following this cycle, the operation described above is repeated.

As already described, during use of the phase B2 shown in FIG. 4, the amount of the gas going in and out the cylinders 12 via the EGR valve 84 during the EGR valve lift crank angle period becomes zero (that is, the inflow gas amount Gin and the outflow gas amount Gout become equal to each other). In this way, if the EGR cut control is performed, a gas merely moves between the cylinder 12 and the EGR passage 82 via the EGR valve 84 during the EGR valve lift crank angle period. In other words, if the EGR cut control is performed, the exhaust gas that recirculates into the cylinders 12 from the EGR passage 82 via the exhaust gas passage 60 (i.e., external EGR gas) is not substantially produced. In addition, since the inflow gas amount Gin and the outflow gas amount Gout are equal to each other, a high pressure fresh air also does not pass through the EGR valve 84 to blow through toward the exhaust gas purifying device 66 during the O/L period between the EGR valve 84 and each intake valve 50.

As described so far, according to the EGR cut control, even if the EGR valve 84 is open, a status that is the same as a state in which the EGR valve 84 is fully closed can be stopped. That is, the recirculation of the exhaust gas that flows through the exhaust gas passage 60 and the EGR passage 82 (introduction of the external EGR gas) can be stopped.

2-2-2. Processing of ECU Concerning EGR Cut Control According to First Embodiment FIG. 7 is a flow chart that illustrates a routine of the processing concerning the EGR cut control according to the first embodiment of the present disclosure. The ECU 110 repeatedly executes the processing of the present routine at a certain interval during operation of the internal combustion engine 10.

In the routine shown in FIG. 7, firstly, the ECU 110 determines whether or not a target EGR ratio is zero, that is, whether there is no EGR gas introduction request (step S100). As already described, the target EGR ratios are set in accordance with the respective engine operating points in an engine operating region that is defined by the engine load (fuel injection amount) and the engine speed. The engine operating points include an engine operating point at which the target EGR ratio is zero. In addition, the target EGR ratio may also be changed in accordance with, for example, an environmental condition of the vehicle (such as, outside air temperature or altitude) without relating to the setting according to the engine operating points.

If the result of determination in step S100 is negative, the ECU 110 promptly ends the processing of the routine currently in progress. If, on the other hand, the result of determination in step S100 is positive, the ECU 110 determines whether or not the high intake air pressure condition (intake port pressure >EGR port pressure) is met (step S102). The intake port pressure and the EGR port pressure used in this determination are obtained by the use of, for example, each of the intake air pressure sensor 46 and the EGR gas pressure sensor 92.

If the result of determination in step S102 is negative, the ECU 110 promptly ends the processing of the routine currently in progress. It should be noted that, if this result of determination in step S102 is negative, the variable valve operating device 100 may alternatively be controlled, for example, such that the opening characteristics of the EGR valve 84 and the opening characteristics of each intake valve 50 that can cause the EGR ratio to become the lowest are obtained.

If, on the other hand, the result of determination in step S102 is positive, the ECU 110 obtains the various parameters A relating to the EGR control (step S104). One example of the parameters A are as described above. In more detail, in this step S104, sensor values or instruction values of actuators that respectively correspond to the respective parameters A are obtained.

Next, the ECU 110 obtains a target fresh air amount (step S106). The target fresh air amounts are, for example, set for the respective engine operating points in an engine operating region that is defined by the engine load (fuel injection amount) and the engine speed. Thus, in this step S106, the target fresh air amount corresponding to the current engine operating point is obtained. It should be noted that, in a routine different from the present routine, the ECU 110 controls the opening degree of the throttle valve 40 and the VN opening degree so as to meet the target fresh air amount.

Next, the ECU 110 executes the EGR cut control (step S108). Specifically, in this step S108, the individual instruction values of the phase, lift amount and operating angle of the EGR valve 84 and the phase, lift amount and operating angle of each intake valve 50 that are used during execution of the EGR cut control are, for example, obtained from a map M2. Then, the variable valve operating device 100 (102, 104) is controlled such that the obtained instruction values are met.

To be more specific, the individual map values of the above-described instruction values stored in the map M2 are determined such that the EGR valve 84 opens during the intake stroke prior to the intake valves 50 and a requirement (EGR cut requirement) that the outflow gas amount Gout be caused to equal the inflow gas amount Gin during the EGR valve lift crank angle period is met. An example of the map M2 can be determined (adapted) by the use of a similar method to that of the map M1 described above. Thus, the individual map values of the map M2 are also determined so as to meet not only the EGR cut requirement but also a requirement that the target fresh air amount be met and a requirement that the fuel consumption become the lowest. It should be noted that, when determining the individual instruction values that meet the EGR cut requirement, at least one of the requirement that the target fresh air amount be met and the requirement that the fuel consumption become the lowest may not always be taken into consideration.

In further addition to the above, if the EGR cut requirement described above is met, even if the EGR valve 84 is open, the gas flow rate at an end portion E (see FIG. 1) of the EGR passage 82 located on the side of the exhaust gas passage 60 becomes zero in average value within a certain time. Therefore, if an experiment is conducted to search a map value that meets the EGR cut requirement described above, a gas flow rate sensor may be attached to the portion E to make sure that an average gas flow rate at the portion E becomes zero. This makes it possible to grasp that the EGR cut requirement described above is met.

It should be noted that examples of obtaining the individual instruction values of the phase, lift amount and operating angle of the EGR valve 84 and the phase, lift amount and operating angle of each intake valve 50 that are used during execution of the EGR cut control may not always use the map M2. That is, for example, the relationship between the passing-through gas flow rate of the EGR valve 84 and the individual instruction values may be modeled using hydrodynamic equations. Then, the individual instruction values may alternatively be obtained by the use of the results of calculation of this kind of model performed during operation of the internal combustion engine 10.

3. Advantageous Effects of EGR Cut Control According to First Embodiment

According to the EGR cut control of the present embodiment described so far, the O/L area concerning the lift curve of the EGR valve 84 and the lift curve of each intake valve 50 is adjusted such that the intake valves 50 open during the intake stroke after the EGR valve 84 opens during the intake stroke and the outflow gas amount Gout and the inflow gas amount Gin concerning the EGR valve 84 become equal to each other. Then, the EGR passage 82 is configured so as to store the gas that flows out to the EGR passage 82 from the cylinders 12 via the EGR valve 84 during execution of the EGR cut control. Thus, if the EGR cut control is executed, the gas moves between the cylinder 12 and the EGR passage 82 via the EGR valve 84 during the EGR valve lift crank angle period. Because of this, the recirculation of the exhaust gas by the external EGR device 80 (i.e., introduction of the external EGR gas) can be substantially stopped while the blow-through of the fresh air to the exhaust gas passage 60 from the cylinders 12 via the EGR passage 82 is reduced.

In further addition to the above, according to the EGR cut control of the present embodiment, there is no need to separately include an EGR control valve at a connecting portion between the EGR passage 82 and the exhaust gas passage 60, in order to stop the recirculation of the exhaust gas. Moreover, it is conceivable that, in an internal combustion engine which, as with the internal combustion engine 10, includes an EGR passage that connects an exhaust gas passage with cylinders and an external EGR device having an EGR valve that is installed at an end portion of this EGR passage located on the side of the cylinders, and in which the adjustment of amount of the external EGR gas that is charged in the cylinders is performed by the use of a variable valve operating device, the variable valve operating device is configured so as to be able to fully close the EGR valve to have an EGR cut function as well as the EGR gas amount adjustment function. However, as a result, the configuration of the variable valve operating device becomes complicated and an additional cost thus occurs. In contrast to this, according to the EGR cut control of the present embodiment, the recirculation of the exhaust gas can be substantially stopped under the high intake air pressure condition without complicating, due to the achievement of the EGR cut function, the configuration of the variable valve operating device 100 provided for achieving the EGR gas amount adjustment function.

Second Embodiment

Next, a second embodiment according to the present disclosure will be described with reference to FIGS. 8A and 8B.

1. Example of Configuration of System According to Second Embodiment

The configuration of the system according to the second embodiment is different from the configuration of the system according to the first embodiment in terms of the configuration of a variable valve operating device. Specifically, the variable valve operating device used in the present embodiment includes an intake variable valve operating device but does not include an EGR variable valve operating device. This intake variable valve operating device has only a phase variable function. The EGR valve 84 is driven by an EGR operating device by which the opening characteristics of the EGR valve 84 is controlled to be constant.

2. EGR Cut Control According to Second Embodiment

Figure 8A:
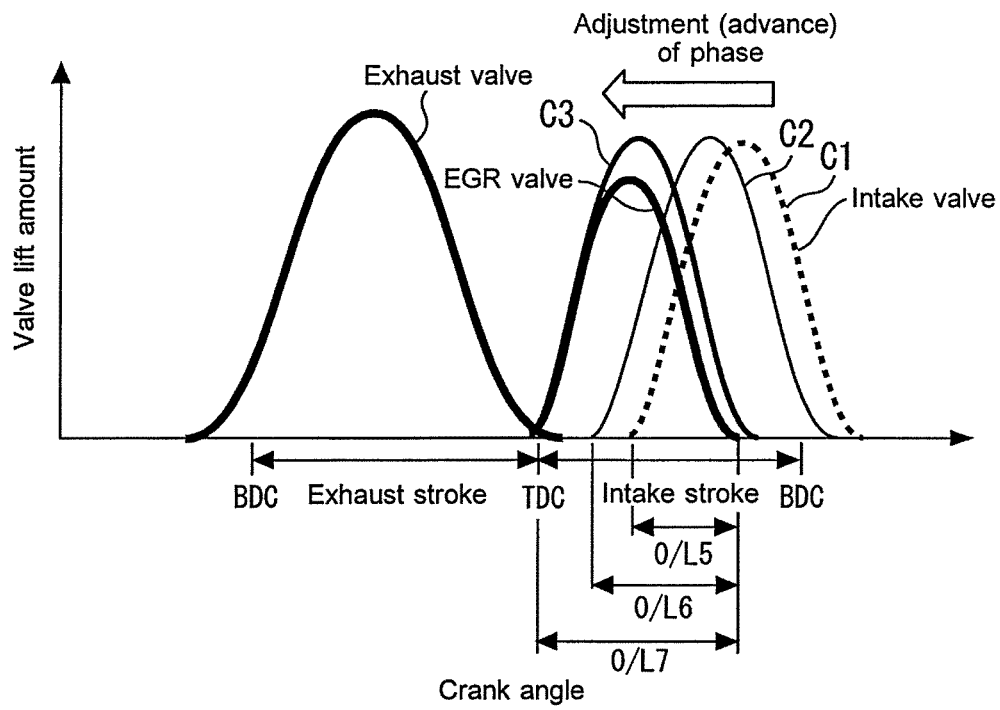
FIGS. 8A and 8B are graphs that illustrate a relationship at the high intake air pressure condition between the passing-through gas amount [g] of the EGR valve, and the O/L period between the EGR valve and each intake valve.
Figure 8B:
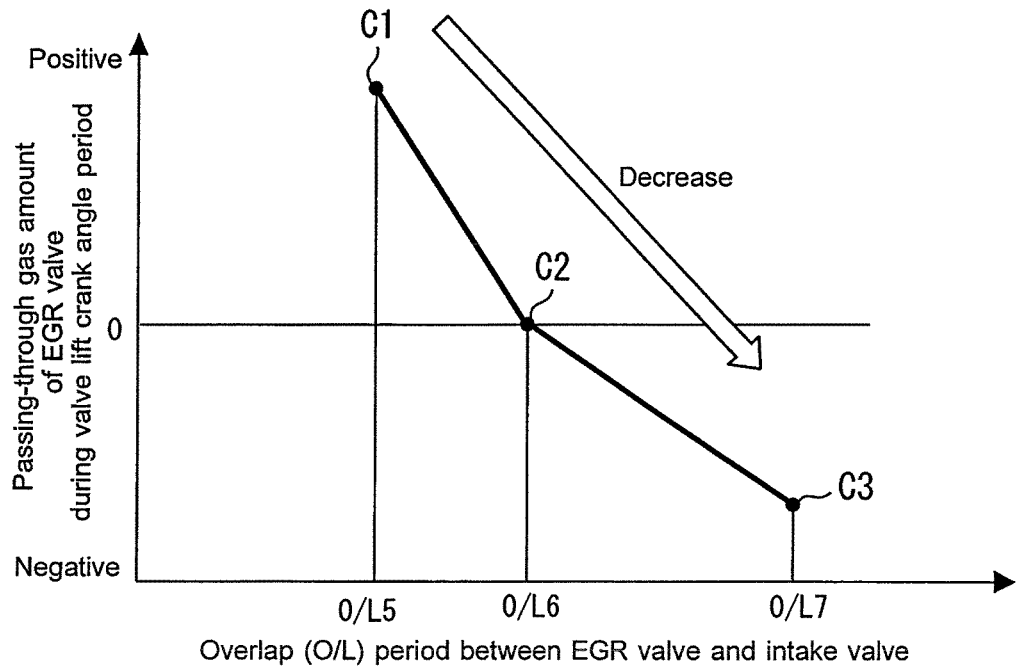

FIGS. 8A and 8B are graphs that illustrate a relationship at the high intake air pressure condition between the passing-through gas amount [g] of the EGR valve 84, and the O/L period between the EGR valve 84 and each intake valve 50. In the example shown in FIGS. 8A and 8B, the O/L period is changed with adjustment of the phase of the intake valves 50.

FIG. 8A represents phases C2 and C3 that are obtained by gradually advancing the phase of each intake valve 50 from a base phase C1 while fixing the lift curve of the EGR valve 84 (and the exhaust valve 72). In the example shown in FIGS. 8A and 8B, the greater the advance amount of the phase of each intake valve 50 is, the longer the O/L period between the EGR valve 84 and each intake valve 50 becomes. Examples O/L5-O/L7 of the O/L period in FIGS. 8A and 8B correspond to the phases C1-C3 of each intake valve 50, respectively. According to the adjustment of the phase of each intake valve 50, as in the example shown in FIG. 4, the O/L period changes and, as a result, the O/L area changes.

In the example of O/L5 in FIGS. 8A and 8B, the passing-through gas amount of the EGR valve 84 shows a positive value due to the O/L period being relatively short. That is, in this example, the EGR gas is charged into the cylinders 12. On the other hand, in the example of O/L6 that is longer than O/L5, the inflow gas amount Gin and the outflow gas amount Gout become equal to each other, and, as a result, the passing-through gas amount of the EGR valve 84 becomes zero. In addition, in the example of O/L7 that is longer than O/L6, similarly to the example of O/L 4 in FIG. 5, the outflow gas amount Gout is greater than the inflow gas amount Gin due to the O/L period being too long, and, as a result, the value of the passing-through gas amount of the EGR valve 84 becomes negative.

In the present embodiment, under a condition supposed in the example shown in FIGS. 8A and 8B, the phase C2 of each intake valve 50 corresponding to O/L6 is used in the EGR cut control. Also, in the present embodiment, the phases of each intake valve 50 that can cause the passing-through gas amount of the EGR valve 84 to be zero as in this example are determined in advance on the basis of the results of an experiment or a simulation performed while changing parameters A relating to the EGR control. Furthermore, the instruction values of the obtained phases of each intake valve 50 are stored in the ECU 110 as a map, for example.

3. Advantageous Effects of EGR Cut Control According to Second Embodiment

According to the EGR cut control of the second embodiment described so far, as long as the intake variable valve operating device having a simple configuration that can perform only an adjustment of the phase of each intake valve 50 is provided, the recirculation of the exhaust gas by the external EGR device 80 can be substantially stopped while the blow-through of the fresh air to the exhaust gas passage 60 from the cylinders 12 via the EGR passage 82 is reduced. Thus, the EGR cut function can be achieved while the cost required for the variable valve operating device is reduced to a low level.

Furthermore, if the adjustment of the phase of the EGR valve 84 is used for achievement of the EGR cut function as in the example shown in FIG. 4, the opening timing of the EGR valve 84 gets away from the exhaust top dead center as a result of the retard of the phase of the EGR valve 84. As a result, a crank angle period in which any of the EGR valve 84 and each intake valve 50 are not open during the intake stroke is present, and the pumping loss of the internal combustion engine 10 becomes greater. In contrast to this, according to the present embodiment that uses the adjustment of the phase of each intake valve 50, the EGR cut function can be achieved while the pumping loss is more reduced than the example in which the adjustment of the phase of the EGR valve 84 is used.

Third Embodiment

Next, a third embodiment according to the present disclosure will be described with reference to FIGS. 9A and 9B.

1. Example of Configuration of System According to Third Embodiment

The configuration of the system according to the third embodiment is different from the configuration of the system according to the second embodiment in terms of the configuration of a variable valve operating device. Specifically, an intake variable valve operating device used in the present embodiment has the continuously variable lift-amount-and-operating-angle function as well as the phase-variable function. It should be noted that, if a device that can continuously change the lift amount and the operating angle while substantially fixing the closing timing of each intake valve 50 is used, the intake variable valve operating device used in the EGR cut control according to the present embodiment may not always has the phase-variable function.

2. EGR Cut Control According to Third Embodiment

Figure 9A:
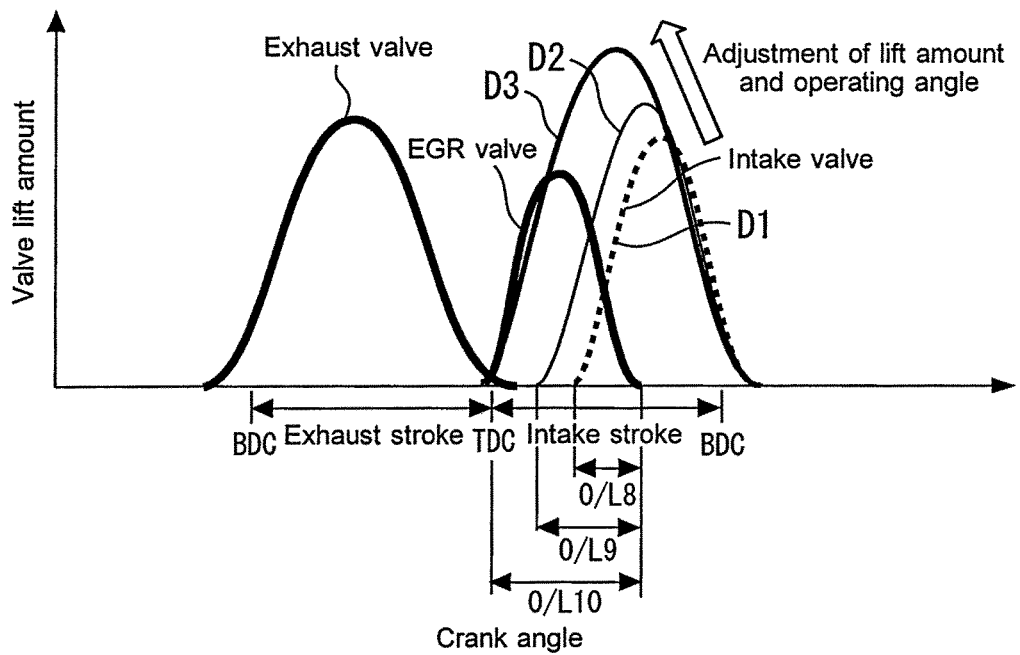
FIGS. 9A and 9B are graphs that illustrate a relationship at the high intake air pressure condition between the passing-through gas amount [g] of the EGR valve, and the O/L period between the EGR valve and each intake valve.
Figure 9B:
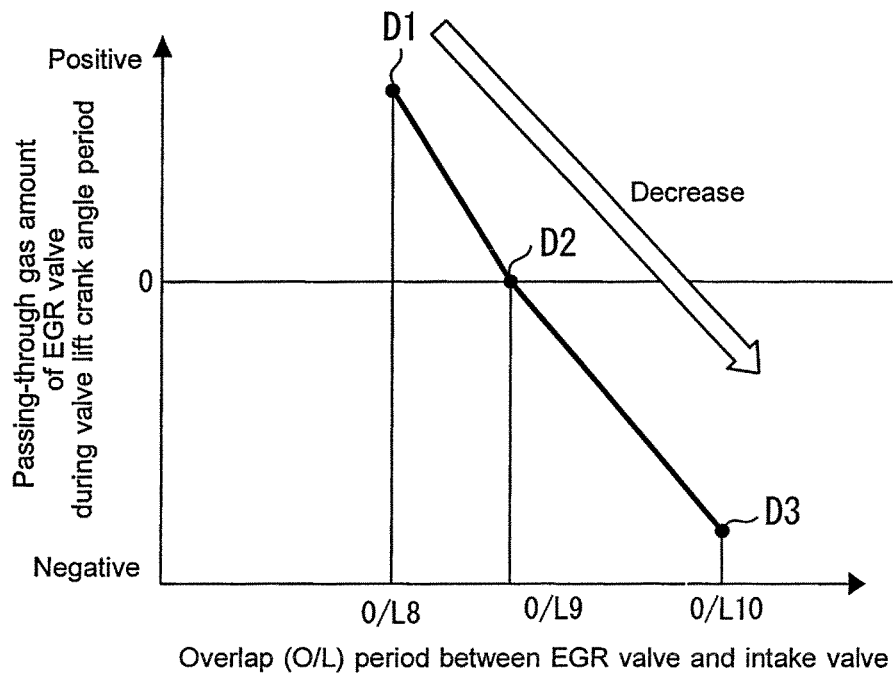

FIGS. 9A and 9B are graphs that illustrate a relationship at the high intake air pressure condition between the passing-through gas amount [g] of the EGR valve 84, and the O/L period between the EGR valve 84 and each intake valve 50. In the example shown in FIGS. 9A and 9B, the O/L period is changed with adjustment of the lift amount and operating angle (and phase) of the intake valves 50.

FIG. 9A represents phases D2 and D3 that are obtained by gradually increasing the lift amount and operating angle of each intake valve 50 from a base phase D1 without changing the closing timing thereof while fixing the lift curve of the EGR valve 84 (and the exhaust valve 72). In the example shown in FIGS. 9A and 9B, the greater the operating angle of each intake valve 50 is, the longer the O/L period between the EGR valve 84 and each intake valve 50 becomes. Examples O/L8-O/L10 of the O/L period in FIGS. 9A and 9B correspond to the phases D1-D3 of each intake valve 50, respectively. According to the adjustment of the operating angle of each intake valve 50, as in the example shown in FIG. 4, the O/L period changes and, as a result, the O/L area changes. In addition, in this example, a change of the lift amount also contributes to a change of the O/L area.

In the example shown in FIGS. 9A and 9B, when O/L9 is selected, the inflow gas amount Gin and the outflow gas amount Gout become equal to each other, and, as a result, the passing-through gas amount of the EGR valve 84 becomes zero. In the present embodiment, under a condition supposed in the example shown in FIGS. 9A and 9B, the phase D2 of each intake valve 50 corresponding to O/L9 is used in the EGR cut control. Also, in the present embodiment, a combination of the phase, lift amount and operating angle of each intake valve 50 that can cause the passing-through gas amount of the EGR valve 84 to be zero as in this example is determined in advance on the basis of the results of an experiment or a simulation performed while changing parameters A relating to the EGR control. Furthermore, the instruction values of the phases, lift amounts and operating angles of each intake valve 50 obtained are stored in the ECU 110 as a map, for example.

3. Advantageous Effects of EGR Cut Control According to Third Embodiment

According to the EGR cut control of the third embodiment described so far, the EGR cut function can be achieved while the pumping loss is more reduced than that in the example in which the adjustment of the phase of the EGR valve 84 is used.

Fourth Embodiment

1. Example of Configuration of System According to Fourth Embodiment

The configuration of the system according to the fourth embodiment is different from the configuration of the system according to the first embodiment in terms of the configuration of a variable valve operating device. Specifically, the variable valve operating device used in the present embodiment includes an EGR variable valve operating device but does not include an intake variable valve operating device. This EGR variable valve operating device has only the phase variable function. The intake valves 50 are driven by an intake operating device by which the opening characteristics of each intake valve 50 is controlled to be constant.

2. EGR Cut Control According to Fourth Embodiment

For the description of the EGR cut control according to the present embodiment, the present embodiment herein refers to FIGS. 4 and 5 used in the first embodiment. As already described, in the example shown in FIGS. 4 and 5, when O/L2 is selected, the inflow gas amount Gin and the outflow gas amount Gout become equal to each other, and, as a result, the passing-through gas amount of the EGR valve 84 becomes zero.

In the present embodiment, under a condition supposed in the example shown in FIGS. 4 and 5, the phase B2 of the EGR valve 84 corresponding to O/L2 is used in the EGR cut control. Also, in the present embodiment, the phase of the EGR valve 84 that can cause the passing-through gas amount of the EGR valve 84 to be zero as in this example is determined in advance on the basis of the results of an experiment or a simulation performed while changing parameters A relating to the EGR control. Furthermore, the instruction values of the phases of the EGR valve 84 obtained are stored in the ECU 110 as a map, for example.

3. Advantageous Effects of EGR Cut Control According to Fourth Embodiment

According to the EGR cut control of the fourth embodiment described so far, as long as the EGR variable valve operating device having a simple configuration that can perform only the adjustment of the phase of the EGR valve 84 is provided, the recirculation of the exhaust gas can be substantially stopped. Thus, the EGR cut function can be achieved while the cost required for the variable valve operating device is reduced to a low level.

Fifth Embodiment

Figure 10:
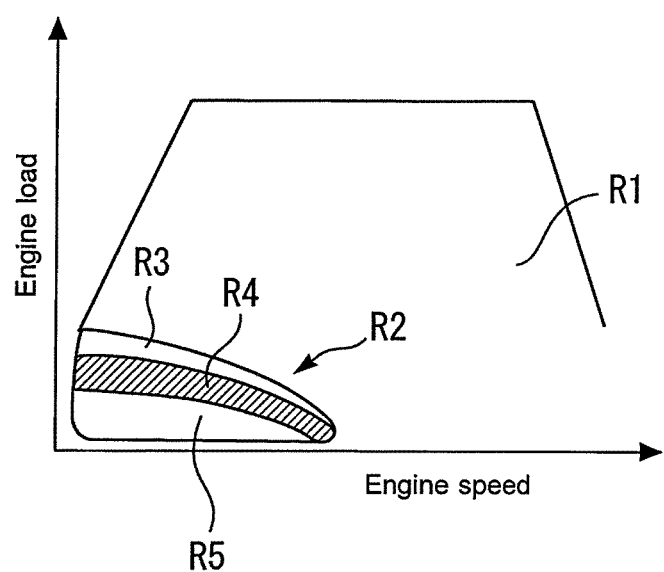
FIG. 10 is a graph for explaining an example of control regions of a throttle valve shown in FIG. 1.

Next, a fifth embodiment according to the present disclosure will be described with reference to FIGS. 10 and 11. It should be noted that, in the following description, the configuration shown in FIG. 1 is supposed to be used as an example of the configuration of the system according to the fifth embodiment.

1. EGR Cut Control According to Fifth Embodiment 1-1. Control Region of Throttle Valve FIG. 10 is a graph for explaining an example of control regions of the throttle valve 40 shown in FIG. 1. In FIG. 10, control regions R1 and R2 of the throttle valve 40 are represented in an engine operating region that is defined by the engine load (fuel injection amount) and the engine speed. In addition, the control region R2 includes control regions R3-R5.

The control region R1, in which the throttle valve 40 is fully open, is generally located on the high-load and high-speed side. The control region R2, in which the opening degree of the throttle valve 40 is controlled to be smaller than a full open degree, is generally located on the low-load and load-speed side relative to the control region R1. In the control region R2, the opening degree of the throttle valve 40 is decreased in this way to lower the pressure in the intake air passage 30, whereby the inflow of the EGR gas into the cylinders 12 can be promoted.

The control region R2 in which the opening degree of the throttle valve 40 is smaller than the full open degree also includes a region in which the high intake air pressure condition is not met. In more detail, the control region R3 is located on the high-load side in the control region R2, in which the high intake air pressure condition is met. The control region R4 is located on the low-load side relative to the control region R3, in which the high intake air pressure condition is met as a result of the throttle valve 40 being opened to have a throttle opening degree greater than the throttle opening degree that has been set in association with this region. The control region R5 is located on the low-load side relative to the control region R4, in which the high intake air pressure condition is not met even if the throttle valve 40 is fully open.

1-2. Outline of EGR Cut Control According to Fifth Embodiment

The basic control manner of the EGR cut control according to the present embodiment is similar to that according to the first embodiment. On that basis, in this EGR cut control, when the opening degree of the throttle valve 40 is smaller than the full open degree (that is, the control region of the throttle valve 40 is R2) and there is no EGR gas introduction request, the ECU 110 determines whether or not the high intake air pressure condition is met by opening the throttle valve 40. Moreover, when the high intake air pressure condition is met if the throttle valve 40 opens (that is, when the control region is R4), the ECU 110 executes the EGR cut control while opening the throttle valve 40 to meet the high intake air pressure condition.

1-3. Processing of ECU Concerning EGR Cut Control According to Fifth Embodiment

Figure 11:
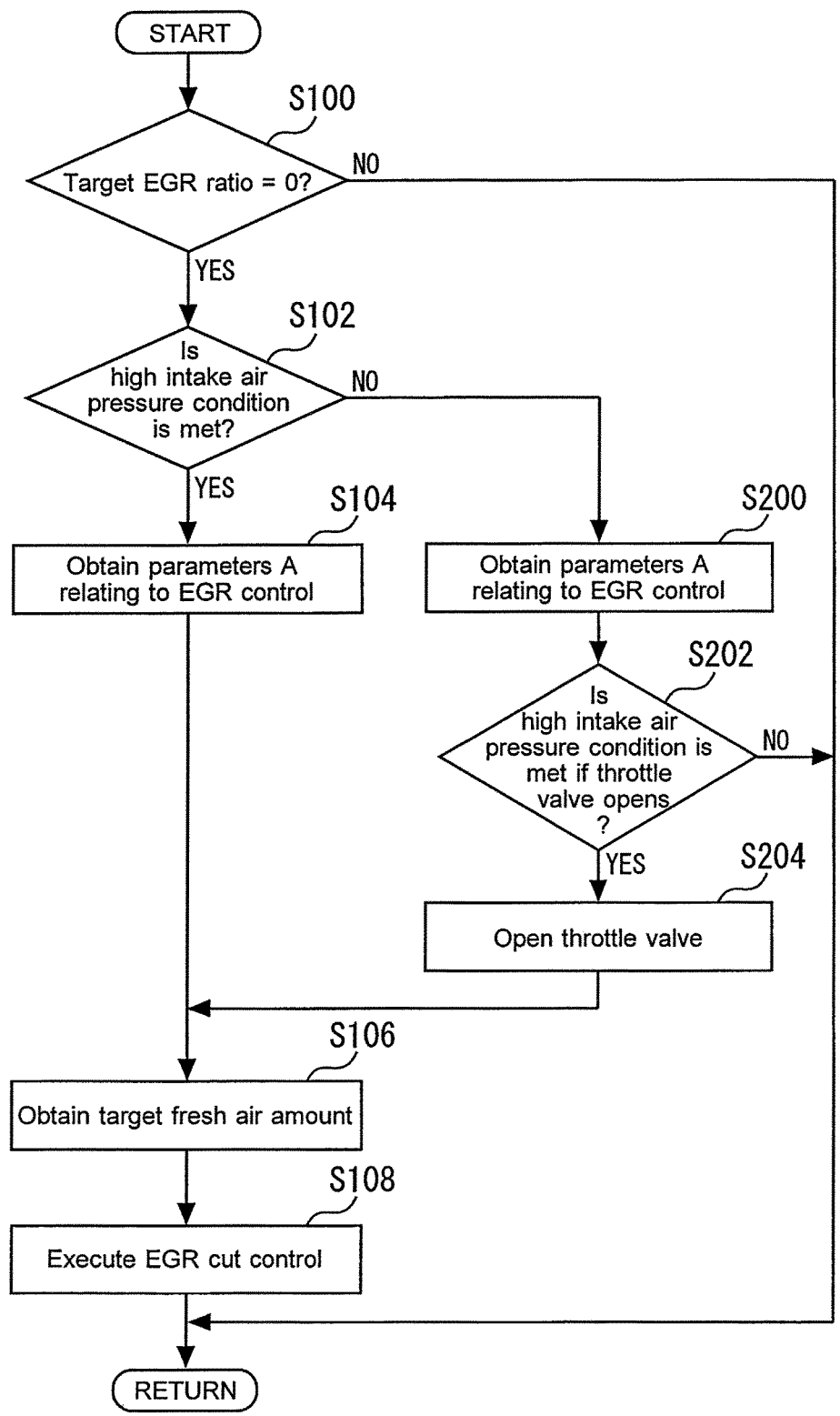
FIG. 11 is a flow chart that illustrates a routine of the processing concerning the EGR cut control according to a fifth embodiment of the present disclosure.

FIG. 11 is a flow chart that illustrates a routine of the processing concerning the EGR cut control according to the fifth embodiment of the present disclosure. The processing of steps S100 to S108 in the routine shown in FIG. 11 is as already described in the first embodiment.

In the routine shown in FIG. 11, if the ECU 110 determines in step S102 that the high intake air pressure condition is not met, it proceeds to step S200. In step S200, the ECU 110 obtains the various parameters A relating to the EGR control by the use of the processing similar to that of step S104.

Next, the ECU 110 determines whether or not the high intake air pressure condition is met by opening the throttle valve 40 (step S202). This determination can be performed by, for example, judging whether or not the current engine operating point is in the control region R4 (see FIG. 10) on the basis of the current engine load (fuel injection amount) and the current engine speed. As a result, if the result of determination in step S202 is negative, the ECU 110 promptly ends the processing of the routine currently in progress.

If, on the other hand, the result of determination in step S202 is positive, the ECU 110 proceeds to step S204. In step S204, the ECU 110 opens the throttle valve 40 so as to have an opening degree that is necessary to meet the high intake air pressure condition. The ECU 110 then executes the processing of steps S106 and S108 in series.

2. Advantageous Effects of EGR Cut Control According to Fifth Embodiment

As described so far, according to the EGR cut control of the present embodiment, even when the opening degree of the throttle valve 40 is smaller than the full open degree when there is no EGR introduction request, if the high intake air pressure condition is met as a result of opening the throttle valve 40, the EGR cut control is executed while the throttle valve 40 is opened to meet the high intake air pressure condition. Thus, an engine operating region at which the EGR cut control is performed can be broadened as compared to an example in which this kind of control of the throttle valve 40 is not performed.

Other Embodiments (Example of Opening Timing of EGR Valve Located in Exhaust Stroke)

In the first to fifth embodiments described above, the EGR valve lift crank angle period is provided only in the intake stroke. However, the EGR valve lift crank angle period according to the present disclosure may alternatively be provided so as to extend from a crank angle position in the exhaust stroke to a crank angle position in the intake stroke as an example shown in FIG. 12 described below, instead of the example described above.

Figure 12:
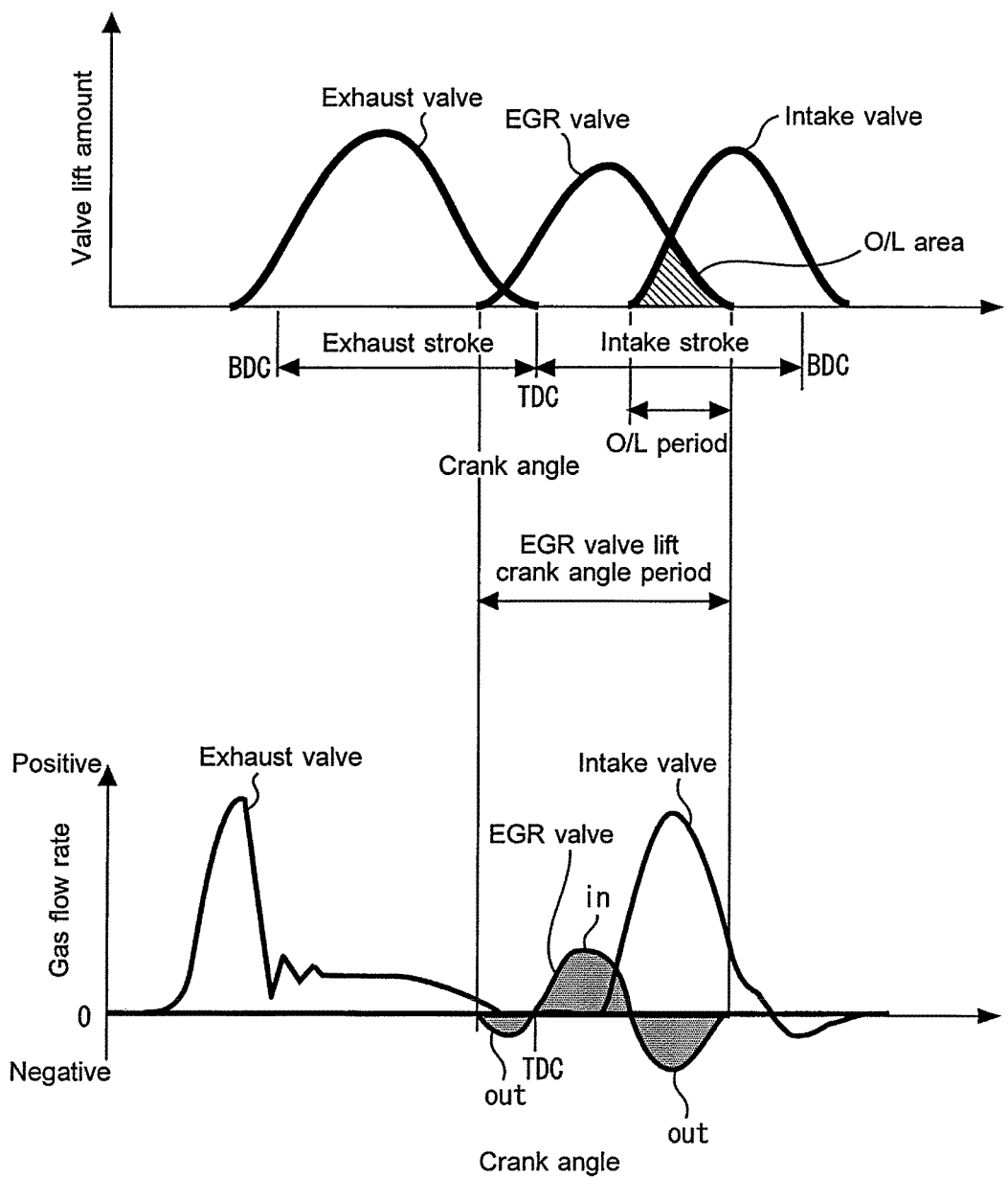
FIG. 12 shows an example in which an opening timing of the EGR valve is located in the exhaust stroke during execution of the EGR cut control.

FIG. 12 shows an example in which the opening timing of the EGR valve 84 is located in the exhaust stroke during execution of the EGR cut control. If the opening timing of the EGR valve 84 is located in the exhaust stroke as shown in FIG. 12, a part of the burnt gas in the cylinders 12 is discharged into the EGR passage 82 during the exhaust stroke. Thus, as shown in FIG. 12, the passing-through gas flow rate [g/s] of the EGR valve 84 shows a negative value during the EGR valve lift crank angle period in the exhaust stroke.

When the internal combustion engine 10 shifts from the exhaust stroke to the intake stroke thereafter, the burnt gas discharged into the EGR passage 82 during the exhaust stroke flows into the cylinders 12 as a so-called internal EGR gas. In more detail, in a crank angle period in which the EGR valve 84 is solely open during the intake stroke, mixed gas of this burnt gas and the gas (mainly, the fresh air) that has blown through to the EGR passage 82 from the cylinders 12 during the intake stroke in the last cycle flows into the cylinders 12. When the intake valves 50 open thereafter, a high pressure fresh air blows through to the EGR passage 82. In more detail, the fresh air blows through to the EGR passage 82 while being mixed with the aforementioned mixed gas.

In the example in which the opening timing of the EGR valve 84 is located in the exhaust stroke as in the example shown in FIG. 12, the sum of the amount of the gas that flows out to the EGR passage 82 from the cylinders 12 during the exhaust stroke and the amount of the gas that flows out to the EGR passage 82 from the cylinders 12 during the intake stroke thereafter corresponds to the outflow gas amount Gout described above. Thus, in the EGR cut control in this example, the O/L area is adjusted such that this outflow gas amount Gout becomes equal to the inflow gas amount Gin that is the amount of the gas that flows into the cylinders 12 from the EGR passage 82 during the intake stroke.

According to the EGR cut control executed as described above, a part of the internal EGR gas described above (i.e., the exhaust gas that is directly drawn back into cylinders from ports that communicates with the cylinders, contrary to the external EGR gas) may remain in the cylinders 12. However, in terms of substantially stopping the recirculation of the exhaust gas into the cylinders 12 via the exhaust gas passage 60 and the EGR passage 82 (that is, substantially stopping the introduction of the external EGR gas), the present embodiment is similar to the first to fifth embodiment in which the EGR valve 84 opens during the intake stroke. In addition, in the examples (first to fifth embodiments) in which the EGR valve 84 opens during the intake stroke, the recirculation of the exhaust gas including not only the external EGR gas but also the internal EGR gas is caused to substantially stop.

(Other Adjustment Methods of O/L Area in EGR Cut Control)

Adjustment methods of the O/L area for causing the outflow gas amount Gout to equal the inflow gas Gin in the EGR cut control according to the present disclosure are not limited to the example described above, as long as the adjustment is performed by the use of at least one of the opening characteristics of the EGR valve 84 and the opening characteristics of each intake valve 50. Moreover, the target of the adjustment of the opening characteristics of the EGR valve 84 may alternatively be, for example, at least one of the phase, lift amount and operating angle of the EGR valve 84, and, similarly, the target of the adjustment of the opening characteristics of each intake valve 50 may alternatively be, for example, at least one of the phase, lift amount and operating angle of each intake valve 50. It should be noted that, in the example in which only the lift amount of at least one of the EGR valve 84 and each intake valve 50 is adjusted, the O/L area is adjusted, with adjustment of the lift amount, without changing the O/L period.

Moreover, in order to adjust the lift amount and operating angle of the EGR valve 84 and each intake valve 50, the internal combustion engine 10 described above is provided with the intake variable valve operating device 102 and the EGR variable valve operating device 104 that can continuously change the lift amount and operating angle. Instead of this kind of example, the adjustment of at least one of the phase, lift amount and operating angle may alternatively be performed by the use of, for example, a variable valve operating device that can select one of a plurality of cams having different profiles from each other.

Furthermore, the targets of adjustment of the opening characteristics of the EGR valve 84 and each intake valve 50 used to adjust the O/L area may not always be the phase, lift amount and operating angle thereof, and may include a lift speed, for example. The lift speed mentioned here refers to a lift change amount [mm/deg] per unit crank angle during opening and closing of a valve.

(Other Example Concerning Connection Point Between Exhaust Gas Passage and EGR Passage)

According to the internal combustion engine 10 described above, the EGR passage 82 is connected to a portion of the exhaust gas passage 60 located on the downstream side of the turbine 22. With this, as already described, the EGR gas can be introduced while achieving a high pressure supercharging. However, the EGR passage according to the present disclosure may alternatively be connected to a portion of an exhaust gas passage located on the upstream side of a turbine, instead of the example described above.

(Other Example of Supercharger)

In the first to fifth embodiments described above, the turbo-supercharger 20 equipped with the variable nozzle device 26 has been taken as an example. However, the "supercharger" according to the present disclosure may alternatively be, for example, a turbo-supercharger that does not include a variable nozzle device, an electrically-driven supercharger, or a mechanically-driven supercharger that uses a torque of a crankshaft of an internal combustion engine to rotate.

The embodiments and modifications described above may be combined in other ways than those explicitly described above as required and may be modified in various ways without departing from the scope of the present disclosure.

What is claimed is:

1. A control device for controlling an internal combustion engine,
the internal combustion engine including:
a supercharger configured to supercharge intake air that flows through an intake air passage;
an intake valve installed at an end portion of the intake air passage on a side of a cylinder;
an exhaust valve installed at an end portion of an exhaust gas passage on a side of the cylinder;
an external EGR device that includes an EGR passage configured to connect the exhaust gas passage with the cylinder, and an EGR valve installed at an end portion of the EGR passage on a side of the cylinder; and
a variable valve operating device configured to change at least one of opening-characteristics of the EGR valve and opening-characteristics of the intake valve,
wherein an EGR valve lift crank angle period in which the EGR valve opens is provided so as to be located at a part of an intake stroke or to extend from a crank angle position in an exhaust stroke to a crank angle position in the intake stroke,
wherein the control device is configured, when a high intake air pressure condition in which a pressure in an intake port of the intake air passage is higher than a pressure in an EGR port of the EGR passage is met and there is no EGR gas introduction request for the external EGR device, to execute an EGR cut control by use of the variable valve operating device,
wherein the control device is configured, in the EGR cut control, to:
open the intake valve during the intake stroke after the EGR valve opens; and
adjust an overlap area that is an area of a portion in which a lift curve of the EGR valve overlaps with a lift curve of the intake valve such that an outflow gas amount into the EGR passage from the cylinder via the EGR valve becomes equal to an inflow gas amount into the cylinder from the EGR passage via the EGR valve, and
wherein the EGR passage is configured so as to store a gas that flows out to the EGR passage from the cylinder via the EGR valve during execution of the EGR cut control.

2. The control device for an internal combustion engine according to claim 1,
wherein the variable valve operating device is configured to change a phase of the intake valve, and
wherein, in the EGR cut control, the control device is configured to adjust the phase of the intake valve to adjust the overlap area such that the outflow gas amount becomes equal to the inflow gas amount.

3. The control device for an internal combustion engine according to claim 1,
wherein the variable valve operating device is configured to change at least of one of a lift amount and operating angle of the intake valve, and
wherein, in the EGR cut control, the control device is configured to adjust at least one of the lift amount and operating angle of the intake valve to adjust the overlap area such that the outflow gas amount becomes equal to the inflow gas amount.

4. The control device for an internal combustion engine according to claim 1,
wherein the internal combustion engine includes a throttle valve installed in the intake air passage, and
wherein the control device is configured, if the high intake air pressure condition is met by opening the throttle valve when an opening degree of the throttle valve is smaller than a full open degree and there is no EGR gas introduction request, to execute the EGR cut control while opening the throttle valve to meet the high intake air pressure condition.

5. The control device for an internal combustion engine according to claim 1,
wherein the supercharger is a turbo-supercharger equipped with a compressor installed in the intake air passage and a turbine installed in the exhaust gas passage, and
wherein the EGR passage is connected to a portion of the exhaust gas passage located on a downstream side of the turbine.

* * * * *